United States Patent
Cho et al.

(10) Patent No.: US 12,210,825 B2
(45) Date of Patent: Jan. 28, 2025

(54) IMAGE CAPTIONING

(71) Applicant: ADOBE INC., San Jose, CA (US)

(72) Inventors: Jaemin Cho, Chapel Hill, NC (US); Seunghyun Yoon, San Jose, CA (US); Ajinkya Gorakhnath Kale, San Jose, CA (US); Trung Huu Bui, San Jose, CA (US); Franck Dernoncourt, San Jose, CA (US)

(73) Assignee: ADOBE INC., San Jose, CA (US)

( * ) Notice: Subject to any disclaimer, the term of this patent is extended or adjusted under 35 U.S.C. 154(b) by 504 days.

(21) Appl. No.: 17/455,533

(22) Filed: Nov. 18, 2021

(65) Prior Publication Data
US 2023/0153522 A1    May 18, 2023

(51) Int. Cl.
*G06F 40/253*    (2020.01)
*G06F 16/583*    (2019.01)
*G06F 18/21*     (2023.01)
*G06F 18/214*    (2023.01)
*G06K 9/62*      (2022.01)

(52) U.S. Cl.
CPC .......... *G06F 40/253* (2020.01); *G06F 16/583* (2019.01); *G06F 18/214* (2023.01); *G06F 18/217* (2023.01)

(58) Field of Classification Search
CPC .... G06F 40/253; G06F 16/583; G06F 18/214; G06F 18/217; G06V 10/774; G06V 10/82
See application file for complete search history.

(56) References Cited

U.S. PATENT DOCUMENTS

| | | | |
|---|---|---|---|
| 10,198,671 B1* | 2/2019 | Yang | G06V 10/768 |
| 10,467,274 B1* | 11/2019 | Ren | G06N 3/006 |
| 2018/0144265 A1* | 5/2018 | Bonawitz | G06N 7/06 |
| 2021/0042579 A1* | 2/2021 | Chen | G06V 10/82 |
| 2021/0201044 A1* | 7/2021 | Herdade | G06T 11/20 |
| 2022/0036153 A1* | 2/2022 | O'Malia | G06N 3/042 |
| 2022/0309597 A1* | 9/2022 | Wang | G06Q 50/16 |
| 2023/0153606 A1* | 5/2023 | Min | G06N 3/08 706/25 |

OTHER PUBLICATIONS

He, Xinwei, et al. "Image caption generation with part of speech guidance." Pattern Recognition Letters 119 (2019): 229-237. (Year: 2019).*

(Continued)

*Primary Examiner* — Oneal R Mistry
*Assistant Examiner* — Jongbong Nah
(74) *Attorney, Agent, or Firm* — F. CHAU & ASSOCIATES, LLC

(57) ABSTRACT

Systems and methods for image captioning are described. One or more aspects of the systems and methods include generating a training caption for a training image using an image captioning network; encoding the training caption using a multi-modal encoder to obtain an encoded training caption; encoding the training image using the multi-modal encoder to obtain an encoded training image; computing a reward function based on the encoded training caption and the encoded training image; and updating parameters of the image captioning network based on the reward function.

20 Claims, 12 Drawing Sheets

(56) References Cited

OTHER PUBLICATIONS

Rennie, Steven J., et al. "Self-critical sequence training for image captioning." Proceedings of the IEEE conference on computer vision and pattern recognition. 2017. (Year: 2017).*

Vedantam, et al., "CIDEr: Consensus-based Image Description Evaluation", arXiv preprint arXiv:1411.5726v2 [cs.CV] Jun. 3, 2015, 17 pages.

Chen, et al., "UNITER: UNiversal Image-TExt Representation Learning", arXiv preprint arXiv:1909.11740v3 [cs.CV] Jul. 17, 2020, 26 pages.

Desai, et al., "VirTex: Learning Visual Representations from Textual Annotations", arXiv preprint arXiv:2006.06666v3 [cs.CV] Sep. 25, 2021, 17 pages.

Vinyals, et al., "Show and Tell: A Neural Image Caption Generator", arXiv preprint arXiv:1411.4555v2 [cs.CV] Apr. 20, 2015, 9 pages.

Xu, et al., "Show, Attend and Tell: Neural Image Caption Generation with Visual Attention", arXiv preprint arXiv:1502.03044v3 [cs.LG] Apr. 19, 2016, 22 pages.

Dosovitskiy, et al., "An Image is Worth 16X16 Words: Transformers for Image Recognition at Scale", arXiv preprint arXiv:2010.11929v2 [cs.CV] Jun. 3, 2021, 22 pages.

Liu, et al., "CPTR: Full Transformer Network for Image Captioning", arXiv preprint arXiv:2101.10804v3 [cs.CV] Jan. 28, 2021, 5 pages.

Anderson, et al., "Bottom-Up and Top-Down Attention for Image Captioning and Visual Question Answering", arXiv preprint arXiv:1707.07998v3 [cs.CV] Mar. 14, 2018, 15 pages.

Vaswani, et al., "Attention Is All You Need", arXiv preprint arXiv:1706.03762v5 [cs.CL] Dec. 6, 2017, 15 pages.

Papineni, et al., 2002, "BLEU: a Method for Automatic Evaluation of Machine Translation", In Proceedings of the 40th Annual Meeting of the Association for Computational Linguistics (ACL) (pp. 311-318), Available at https://aclanthology.org/P02-1040.pdf, 8 pages.

Lin, 2004, "Rouge: A Package for Automatic Evaluation of Summaries", In Text Summarization Branches Out, Association for Computational Linguistics, Available at https://aclanthology.org/W04-1013.pdf, 8 pages.

Banerjee, et al., 2005, "METEOR : An Automatic Metric for MT Evaluation with Improved Correlation with Human Judgments", in Proceedings of the ACL Workshop on Intrinsic and Extrinsic Evaluation Measures for Machine Translation and/or Summarization, Association for Computational Linguistics (pp. 65-72), Available at https://aclanthology.org/W05-0909.pdf, 8 pages.

Anderson, et al., "SPICE: Semantic Propositional Image Caption Evaluation", arXiv preprint arXiv:1607.08822v1 [cs. CV] Jul. 29, 2016, 17 pages.

Zhang, et al., "BERTScore: Evaluating Text Generation with BERT", arXiv preprint arXiv:1904.09675v3 [cs.CL] Feb. 24, 2020, 43 pages.

Lee, et al., 2020, "VILBERTScore: Evaluating Image Caption Using Vision-and-Language BERT", In Proceedings of the First Workshop on Evaluation and Comparison of NLP Systems (Eval4NLP) (pp. 34-39), Association for Computational Linguistics, Available at https://aclanthology.org/2020.eval4nlp-1.4.pdf, 6 pages.

Lee, et al., "UMIC: An Unreferenced Metric for Image Captioning via Contrastive Learning", arXiv preprint arXiv:2106.14019v1 [cs.CL] Jun. 26, 2021, 8 pages.

Hessel, et al., "CLIPScore: A Reference-free Evaluation Metric for Image Captioning", arXiv preprint arXiv:2104.08718v2 [cs.CV] Sep. 14, 2021, 15 pages.

Ranzato, et al., "Sequence Level Training With Recurrent Neural Networks", arXiv preprint arXiv:1511.06732v7 [cs.LG] May 6, 2016, 16 pages.

Bengio, et al., "Scheduled Sampling for Sequence Prediction with Recurrent Neural Networks", arXiv preprint arXiv:1506.03099v3 [cs.LG] Sep. 23, 2015, 9 pages.

Williams, 1992, "Simple Statistical Gradient-Following Algorithms for Connectionist Reinforcement Learning", In Machine Learning 8 (pp. 229-256), Available at https://people.cs.umass.edu/~barto/courses/cs687/williams92simple.pdf, 27 pages.

Rennie, et al., "Self-critical Sequence Training for Image Captioning", arXiv preprint arXiv:1612.00563v2 [cs.LG] Nov. 16, 2017, 16 pages.

Luo, "A Better Variant of Self-Critical Sequence Training", arXiv preprint arXiv:2003.09971v2 [cs.CV] May 10, 2020, 5 pages.

Dai, et al., "Towards Diverse and Natural Image Descriptions via a Conditional GAN", arXiv preprint arXiv:1703.06029v3 [cs.CV] Aug. 11, 2017, 10 pages.

Wang, et al., "Diverse and Accurate Image Description Using a Variational Auto-Encoder with an Additive Gaussian Encoding Space", arXiv preprint arXiv:1711.07068v1 [cs.CV] Nov. 19, 2017, 11 pages.

Lee, et al., "CapWAP: Captioning with a Purpose", arXiv preprint arXiv:2011.04264v1 [cs.CL] Nov. 9, 2020, 14 pages.

Dai, et al., "Contrastive Learning for Image Captioning", arXiv preprint arXiv:1710.02534v1 [cs.CV] Oct. 6, 2017, 10 pages.

Luo, et al., "Discriminability objective for training descriptive captions", arXiv preprint arXiv:1803.04376v2 [cs.CV] Jun. 8, 2018, 14 pages.

Liu, et al., "Show, Tell and Discriminate: Image Captioning by Self-retrieval with Partially Labeled Data", arXiv preprint arXiv:1803.08314v3 [cs.CV] Jul. 23, 2018, 17 pages.

Radford, et al., "Learning Transferable Visual Models From Natural Language Supervision", arXiv preprint arXiv:2103.00020v1 [cs.CV] Feb. 26, 2021, 48 pages.

Lin, et al., "Microsoft COCO: Common Objects in Context", arXiv preprint arXiv:1405.0312v3 [cs.CV] Feb. 21, 2015, 15 pages.

Karpathy, et al., "Deep Visual-Semantic Alignments for Generating Image Descriptions", arXiv preprint arXiv:1412.2306v2 [cs.CV] Apr. 14, 2015, 17 pages.

Shen, et al., "How Much Can CLIP Benefit Vision-and-Language Tasks?", arXiv preprint arXiv:2107.06383v1 [cs.CV] Jul. 13, 2021, 14 pages.

Liu, et al., "ROBERTa: A Robustly Optimized BERT Pretraining Approach", arXiv preprint arXiv:1907.11692v1 [cs. CL] Jul. 26, 2019, 13 pages.

* cited by examiner

IMAGE CAPTIONING

BACKGROUND

The following relates generally to natural language processing, and more specifically to image captioning.

Natural language processing (NLP) refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. These models can express the relative probability of multiple answers.

NLP can be applied in a search context. For example, search indexing involves structuring and parsing data to provide fast and accurate information retrieval. Files such as music, images, and text may be indexed based on associated tags or vector representations that can be generated using NLP. After the search indexing is performed, a search application can search a large amount of information in a short period of time because the tags or vectors are compared rather than the information in the file itself.

Image captioning is an NLP task of generating a textual description (i.e., a caption) of an image. Words in a caption can be used to index an image so that it can be retrieved from an image search database. Existing deep learning based approaches for image captioning train an image-conditioned language model on an image-caption dataset. For example, an image captioning model can be trained by maximizing likelihood over ground truth captions, then maximizing n-gram based metrics between predicted captions and ground truth captions.

However, since the n-gram based metrics heavily depend on self-generated ground-truth captions, the existing models suffer from a resulting exposure bias (i.e., an accumulation of errors). Because these ground truth captions do not capture all information that is relevant for fully describing an image, the existing image captioning models do not learn to produce optimally relevant and informative image captions.

SUMMARY

The present disclosure describes systems and methods for image captioning including an image captioning network that is trained according to a multi-modal reward function. In some examples, a training caption is generated for a training image using the image captioning network. Both the training caption and the training image are encoded using a multi-modal encoder. A training component computes a reward function based on the encoded training caption and the encoded training image. The parameters of the image captioning network are updated based on the reward function.

A method, apparatus, non-transitory computer readable medium, and system for image captioning are described. One or more aspects of the method, apparatus, non-transitory computer readable medium, and system include generating a training caption for a training image using an image captioning network; encoding the training caption using a multi-modal encoder to obtain an encoded training caption; encoding the training image using the multi-modal encoder to obtain an encoded training image; computing a reward function based on the encoded training caption and the encoded training image; and updating parameters of the image captioning network based on the reward function.

A method, apparatus, non-transitory computer readable medium, and system for image captioning are described. One or more aspects of the method, apparatus, non-transitory computer readable medium, and system include receiving an image; encoding the image using an image captioning network to obtain a hidden image representation; and decoding the hidden image representation using the image captioning network to obtain a caption describing the image, wherein the image captioning network is trained by encoding training images and training captions from image captioning network in a same embedding space using a multi-modal encoder, and by comparing the encoded training images and the encoded training captions.

An apparatus, system, and method for image captioning are described. One or more aspects of the apparatus, system, and method include a multi-modal encoder configured to encode a training caption to obtain an encoded training caption, and to encode a training image to obtain an encoded training image and an image captioning network configured to encode an image to obtain a hidden image representation and to decode the hidden image representation to obtain a caption describing the image, wherein the image captioning network is trained by comparing the encoded training caption and the encoded training image.

DETAILED DESCRIPTION

Figure 1:
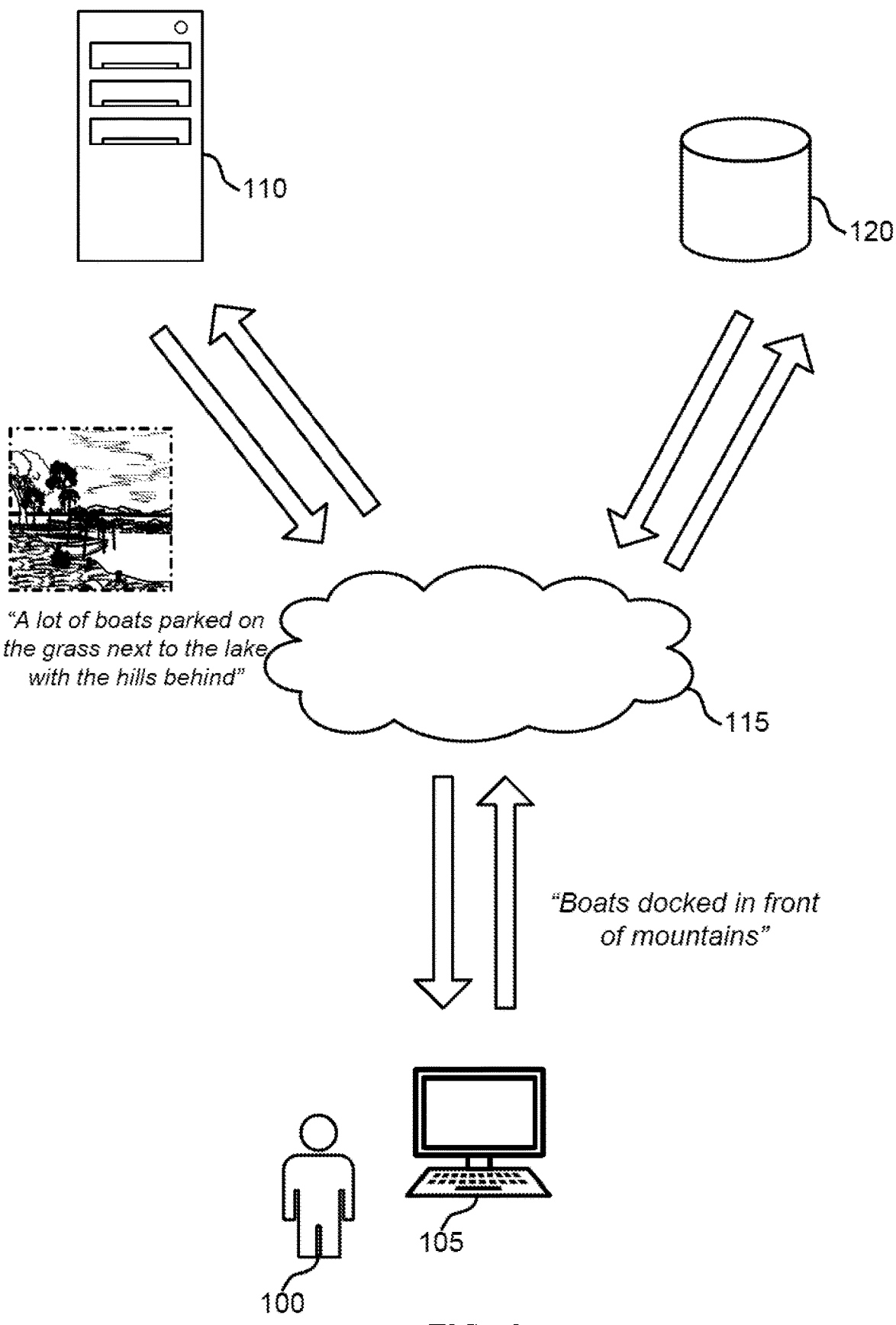
FIG. 1 shows an example of an image search system according to aspects of the present disclosure.

The present disclosure relates to natural language processing (NLP), and more specifically, to image captioning. Image captioning systems, learn to generate image captions based on image-caption datasets. Conventional deep-learning based image captioning systems train an image-conditioned language model on an image-caption dataset. For example, conventional image captioning system models can be trained by maximizing likelihood over ground truth captions, and then maximizing n-gram (a contiguous sequence of n items from a given sample of text or speech) based metrics between predicted captions and the ground truth captions. In other words, these conventional image captioning system models are trained according to reference caption-based rewards. However, since n-gram based metrics heavily depend on caption annotators' writing styles, these ground truth captions often do not capture important image information, and the reference caption-based rewards do not effectively train the models to produce high-quality image captions.

An embodiment of the present disclosure includes a technologically advantageous training machine learning model and training component. The machine learning model can generate a training caption for a training image and can encode the training caption and the training image. The training component can compute a multi-modal (i.e., both image and text-based) reward function based on the encoded training caption and training image and can train the machine learning model based on the reward function. In some embodiments, the training component can train the machine learning model based on a calculated grammar score output by the machine learning model. In some embodiments, the training component can train the machine learning model based on a negative training sample generated from a specific attribute of a caption.

By calculating and training according to a multi-modal reward function based on both an encoded caption and an encoded image, the unconventional training component and machine learning model included in image captioning systems and methods described by the present disclosure avoid exposure bias that is inherent in systems that rely solely on ground truth captions for training, thus providing image captions that include more fine-grained details than the conventional image captioning systems. In a text-to-image searching context, these image captions accordingly allow systems and methods described by embodiments of the present disclosure to provide image results to a user that more closely match a user query than images returned by convention image searching systems.

Additionally or alternatively, by employing a training component that can fine-tune the machine learning model according to a grammar score, image captioning systems and methods described by some embodiments of the present disclosure can provide image captions that provide more grammatically correct image captions than conventional image captioning systems. Additionally, by employing training component that can fine tune the machine-learning model according to a negative training sample that is related to an attribute-specific caption, image captioning systems and methods described by the present disclosure can provide more descriptive image captions than conventional image captioning systems.

Embodiments of the present disclosure include a machine learning model that leverages multi-modal text and image encoder neural networks and does not rely on fine-grain image annotations to train the model. For example, a contrastive language-image pre-training model (CLIP) may be used where image and text encoders are contrastively trained on an image-text dataset.

In some embodiments, the machine learning model can generate captions that include fine-grained details from images by using image-text relevance scores of a multi-modal encoder as rewards. Additionally, the machine learning model can be guided to obtain desired properties. For example, the multi-modal encoder reward model may be fine-tuned with data augmentation to change properties of generated captions, such as grammar or image background description.

An embodiment of the disclosure includes a machine learning model that can inject grammatical knowledge into a multi-modal encoder so that the model generates a grammatically enhanced image caption for an image. The multi-modal captioning model considers image caption generation and image retrieval together. For example, the model can be applied to a neural image search based on fine-grained queries.

In some examples, the machine learning model includes other models that can compute vision and language representations, such as UNITER, VirTex, or a suitable custom model so that systems and methods according to present disclosure can beneficially interact with applications that include multi-modal content (e.g., Adobe® Stock, Behance, Photoshop, etc.).

Embodiments of the present disclosure may be used in the context of image searching. For example, a system or method based on the present disclosure may be used to return an image and caption to a user in response to receiving a user query, where the image corresponds to a caption generated according to a system or method based on the present disclosure and the image and caption are retrieved based on the user query.

Embodiments of the disclosure can be implemented in an image search context. An example application for image search is provided with reference to FIGS. 1-3. Details regarding the architecture of an example image captioning apparatus are provided with reference to FIG. 4. Examples of a process for image captioning are provided with reference to FIGS. 5-6. Examples of a training process for a machine learning mode for image captioning are provided with reference to FIGS. 7-12.

Image Search System

FIG. 1 shows an example of an image search system according to aspects of the present disclosure. The example shown includes user 100, user device 105, image search apparatus 110, cloud 115, and database 120.

In the example of FIG. 1, one or more users 100 may enter a query into a user interface via an input component of user device 105. An input device may be a computer mouse, keyboard, keypad, trackball, and/or voice recognition device. An input component may include any combination of devices that allow users to input information into a computing device, such as buttons, a keyboard, switches, and/or dials. In addition, the input component may include a touch-screen digitizer overlaid onto the display that can sense touch and interact with the display. A user interface enables a user to interact with user device 105. In some embodiments, the user interface may include an audio device, such as an external speaker system, an external display device such as a display screen, or an input device (e.g., remote control device interfaced with the user interface directly or through an IO controller module). In some cases, a user interface may be a graphical user interface (GUI). The user device 105 transmits the query to the image search apparatus 110. For each query, image search apparatus 110 is configured to retrieve one or more images and/or captions based on the query.

One or more users 100 communicates with the image search apparatus 110 via one or more user devices 105 and the cloud 115. The user device 105 may be a personal computer, laptop computer, mainframe computer, palmtop computer, personal assistant, mobile device, or any other suitable processing apparatus. In some examples, the user device 105 includes software that enables a user 100 to enter a query (e.g., "Boats docked in front of mountains") into a GUI, transmits the query to image search apparatus 110, receives one or more images and/or captions from image search apparatus 110 (e.g., the image illustrated in FIG. 1 and the caption "A lot of boats parked on the grass next to the lake with the hills behind"), and displays the one or more images and/or captions to the user 100. Software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

Image search apparatus 110 may include a computer implemented network comprising a training component, a search component, and a machine learning model. Image search apparatus 110 may also include a processor unit and a memory unit. Additionally, image search apparatus 110 can communicate with the user device 105 and the database 120 via the cloud 115. The training component, the search component, and the machine learning model are examples of, or include aspects of, the corresponding elements described with reference to FIG. 4.

In some cases, image search apparatus 110 is implemented on a server. A server provides one or more functions to users 100 linked by way of one or more of the various networks. In some cases, the server includes a single microprocessor board, which includes a microprocessor responsible for controlling all aspects of the server. In some cases, a server uses microprocessor and protocols to exchange data with other devices/users 100 on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

In some examples, image search apparatus 110 can encode images and generate captions for the images according to a machine learning model. In some examples, image search apparatus can store the encoded images and captions in database 120. In some examples, image search apparatus 110 can receive the query from the user device 110, retrieve one or more images and/or captions from the database 120 based on the query, and provide the one or more images and or/captions to the user device 110.

In some examples, the machine learning model can include an artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During a training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

In neural networks, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

In some examples, image search apparatus 110 includes a training component that can perform such a training process on the one or more neural networks. Further detail regarding the architecture of image search apparatus 110 and the machine learning model is provided with reference to FIG. 4. Further detail regarding a process for image captioning is provided with reference to FIGS. 5-8. Further detail regarding a process for training a machine learning model is provided with reference to FIGS. 9-12.

A cloud 115 is a computer network configured to provide on-demand availability of computer system resources, such as data storage and computing power. In some examples, the cloud 115 provides resources without active management by the user 100. The term cloud 115 is sometimes used to describe data centers available to many users 100 over the Internet. Some large cloud 115 networks have functions distributed over multiple locations from central servers. A server is designated an edge server if it has a direct or close connection to a user 100. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, a database 120 stores data (e.g., images to be searched) in a specified format known as a schema. A database 120 may be structured as a single database 120, a distributed database 120, multiple distributed databases 120, or an emergency backup database 120. In some cases, a database 120 controller may manage data storage and processing in a database 120. In some cases, a user 100 interacts with database 120 controller. In other cases, database 120 controller may operate automatically without user 100 interaction.

In some cases, database 120 may be included in image search apparatus 110. In some cases, image search apparatus 110 can store various outputs produced by image search apparatus 110 (such as images, captions, training images, training captions, encoded images, encoded captions, hidden representations, grammatically correct captions, training samples, etc. as described according to the present disclosure) in database 120 according to a database schema that records and maintains associations between the various outputs. Database 120 is an example of, or includes aspects of, the corresponding element described with reference to FIGS. 7 and 8.

Figure 2:
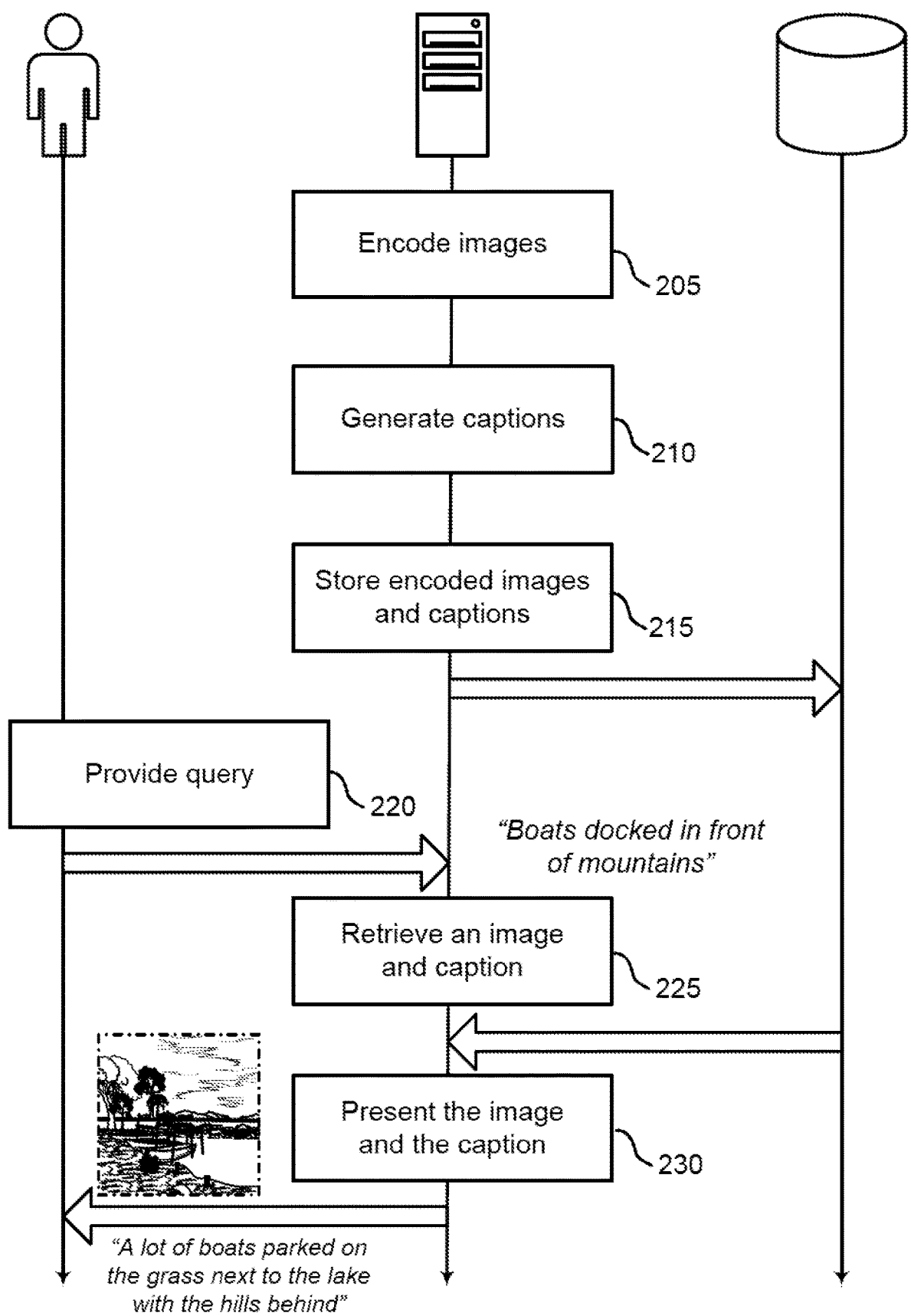
FIG. 2 shows an example of a text-to-image search method according to aspects of the present disclosure.

FIG. 2 shows an example of text-to-image searching according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the system encodes images. In some cases, the operations of this step refer to, or may be performed by, an image search apparatus as described with reference to FIG. 1. In some cases, the image search apparatus can encode images according to a machine learning model as described with reference to FIGS. 4-8.

At operation 210, the system generates captions for the images. In some cases, the operations of this step refer to, or may be performed by, an image search apparatus as described with reference to FIG. 1. In some cases, the image search apparatus can generate captions for the images as described with reference to FIGS. 4-8.

At operation 215, the system stores encoded images and captions in the database. In some cases, the operations of this step refer to, or may be performed by, an image search apparatus as described with reference to FIG. 1. For example, the image search apparatus can provide the encoded images and captions to the database, and the database can store the encoded images and captions. For example, each stored encoded image can be associated with one or more stored captions according to a schema, and the one or more stored captions can be associated with each other based on a common association with an image. For example, each caption can be embedded as metadata in a corresponding image.

At operation 220, the system provides a query to the image search apparatus. In some cases, the operations of this step refer to, or may be performed by, a user as described with reference to FIG. 1. For example, a user may provide a query to an image search apparatus via a user interface of a user device as described with reference to FIG. 1. For example, the user can enter a query such as "boats docked in front of mountains" into a text search box of a GUI.

At operation 225, the system retrieves an image and caption based on the query. In some cases, the operations of this step refer to, or may be performed by, an image search apparatus as described with reference to FIG. 1. For example, the image search apparatus can compare the query to the captions stored in the database of FIG. 1, and can select captions based on a similarity between the captions and the query. In some cases, the image search apparatus can determine the similarity according to a weighting factor, such as term frequency-inverse document frequency (TFIDF), and a ranking function, such as by summing weighting factors associated with words in the query. The image search apparatus can retrieve images and other captions based on their association with the selected captions in the schema.

At operation 230, the system presents the image and the caption to the user. In some cases, the operations of this step refer to, or may be performed by, an image search apparatus as described with reference to FIG. 1. For example, the image search apparatus can present one or more images and/or captions that it has retrieved from a database to a user via a GUI of a user device as described with reference to FIG. 1.

Figure 3:
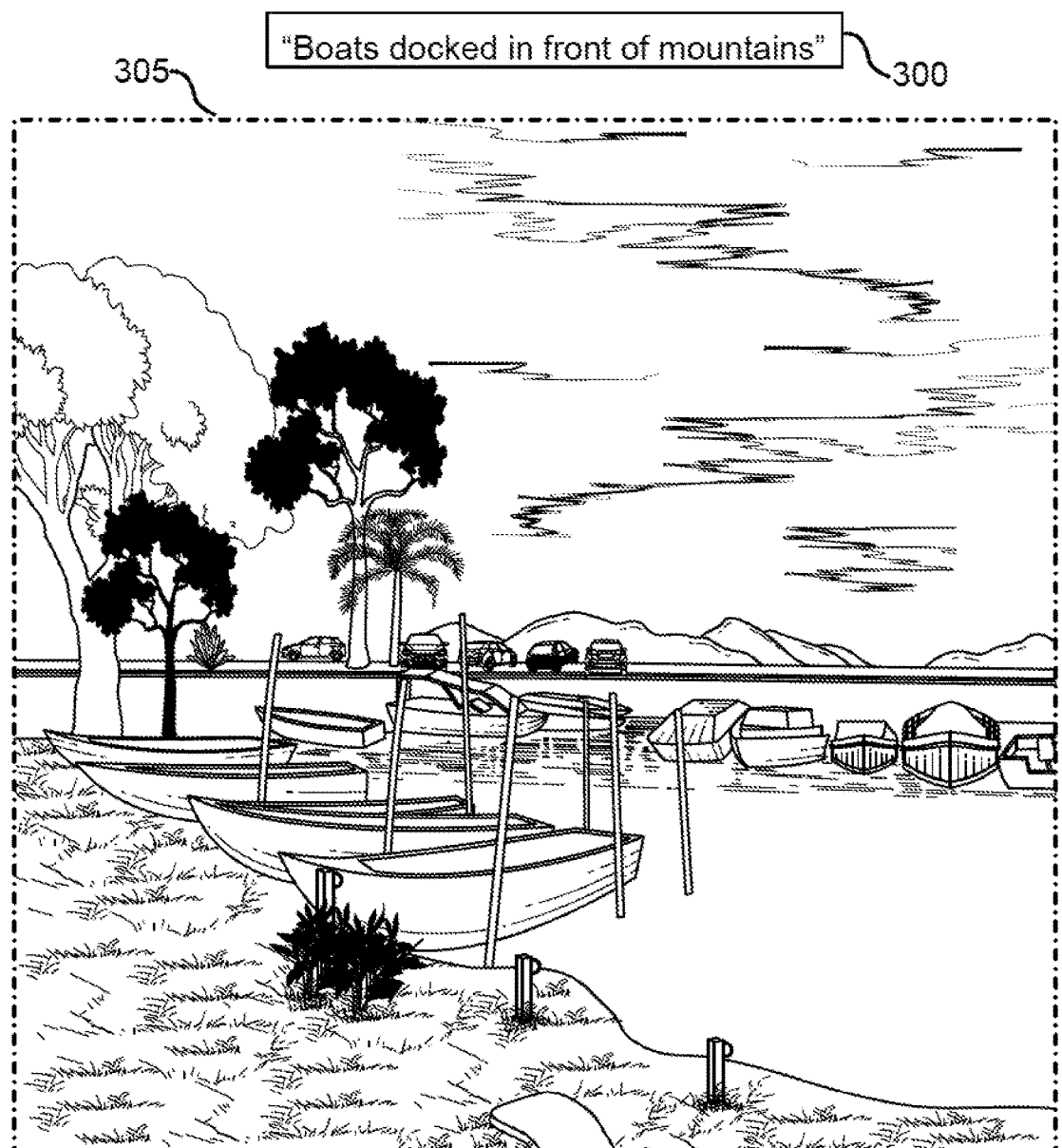
FIG. 3 shows an example of an example of image retrieval according to aspects of the present disclosure.

FIG. 3 shows an example of an example of image retrieval according to aspects of the present disclosure. The example shown includes query 300, image 305, and image caption 310. For example, the elements of FIG. 3 are examples of elements that can be displayed by a GUI of a user device as described with reference to FIG. 1. Query 300 can be entered by a user and image 305 and image caption 310 can be retrieved and presented to the user as described with reference to FIGS. 1-2. In some examples, in addition to image caption 310, additional image captions that are associated with image 305 and image caption 310 in a database schema according to embodiments of the present disclosure can be retrieved and displayed.

Architecture

An image search apparatus is described with reference to FIG. 4. One or more aspects of the apparatus include a multi-modal encoder configured to encode a training caption to obtain an encoded training caption, and to encode a training image to obtain an encoded training image and an image captioning network configured to encode an image to obtain a hidden image representation and to decode the hidden image representation to obtain a caption describing the image, wherein the image captioning network is trained by comparing the encoded training caption and the encoded training image.

Some examples of the apparatus further include a grammar network configured to compute a grammar score based on the training caption. In some aspects, the multi-modal encoder is fine-tuned based on an output of the grammar network. In some aspects, the image captioning network is trained based on an output of the grammar network.

Some examples of the apparatus further include a training component configured to generate sample pairs for a specific attribute, wherein the multi-modal encoder is fine-tuned based on the sample pairs. In some aspects, the multi-modal encoder comprises a contrastive language-image pre-training (CLIP) model. In some aspects, the image captioning network comprises a transformer model.

Some examples of the apparatus further include a search component configured to receive a search query comprising the image and to retrieve images from a database based on the caption and the search query.

Figure 4:
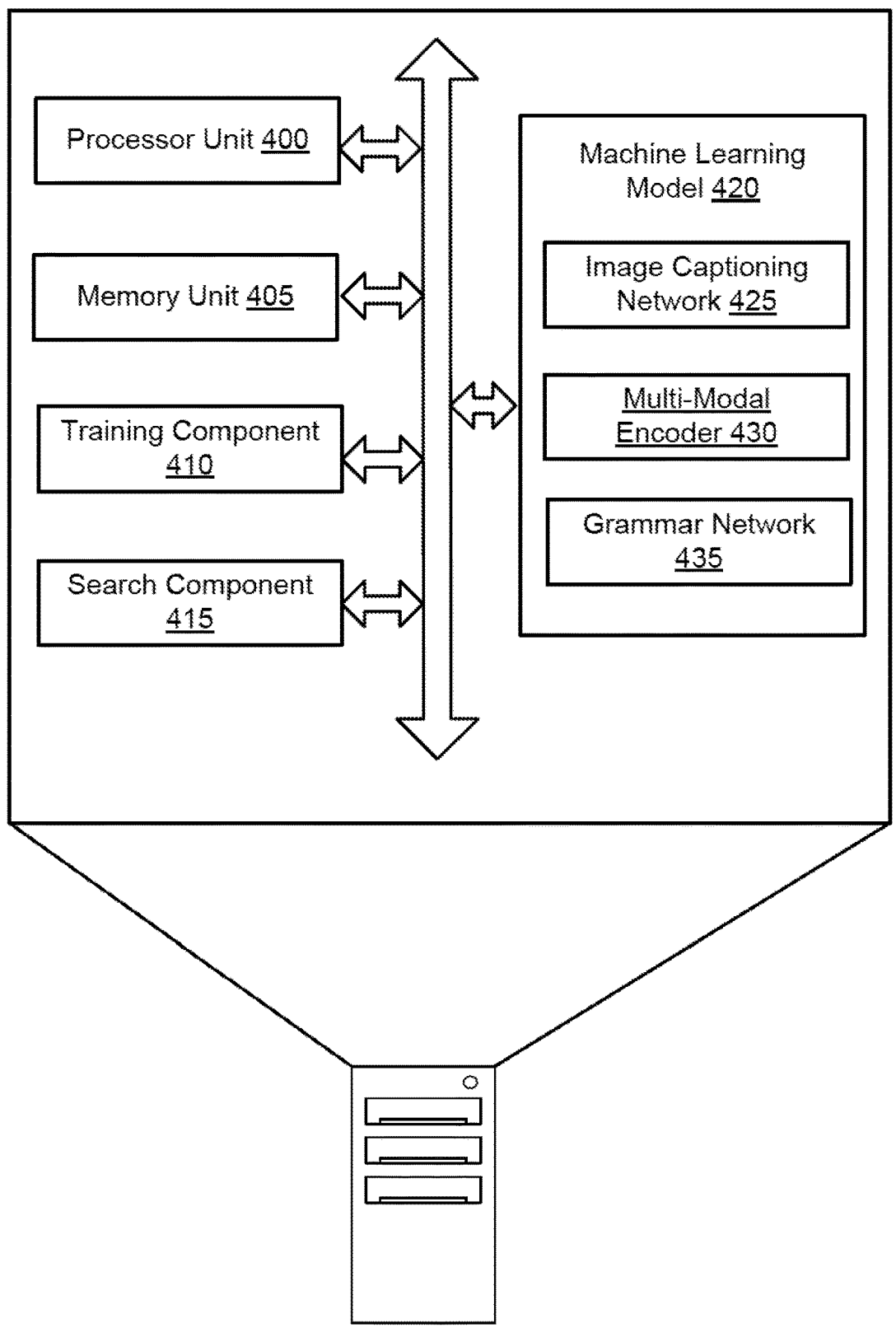
FIG. 4 shows an example of an image search apparatus according to aspects of the present disclosure.

FIG. 4 shows an example of an image search apparatus according to aspects of the present disclosure. The example shown includes processor unit 400, memory unit 405, training component 410, search component 415, and machine learning model 420. In the example shown, machine learning model 420 includes image captioning network 425, multi-modal encoder 430, and grammar network 435.

Processor unit 400 includes one or more processors. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 400 is configured to operate memory unit 405 using a memory controller. In other cases, a memory controller is integrated into processor unit 400. In some cases, processor unit 400 is configured to execute computer-readable instructions stored in memory unit 405 to perform various functions. In some embodiments, processor unit 400 includes special purpose components for modem processing, baseband processing, digital signal processing, or transmission processing.

Memory unit 405 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, training component 410 trains machine learning model 420. According to some aspects, training component 410 uses a reinforcement learning model to train machine learning model 420. Reinforcement learning is one of three basic machine learning paradigms, alongside supervised learning and unsupervised learning. Specifically, reinforcement learning relates to how software agents make decisions in order to maximize a reward. The decision making model may be referred to as a policy. This type of learning differs from supervised learning in that labelled training data is not needed, and errors need not be explicitly corrected. Instead, reinforcement learning balances exploration of unknown options and exploitation of existing knowledge. In some cases, the reinforcement learning environment is stated in the form of a Markov decision process (MDP). Furthermore, many reinforcement learning algorithms utilize dynamic programming techniques. However, one difference between reinforcement learning and other dynamic programming methods is that reinforcement learning does not require an exact mathematical model of the MDP. Therefore, reinforcement learning models may be used for large MDPs where exact methods are impractical.

For example, according to some aspects, training component 410 computes a reward function based on an encoded training caption and an encoded training image. In some examples, training component 410 updates parameters of image captioning network 425 based on the reward function. In some examples, training component 410 computes a gradient of an expected value of the reward function, where the parameters of image captioning network 425 are updated based on the gradient. In some aspects, the parameters of image captioning network 425 are updated based on a reinforcement learning model with a self-critical baseline.

In some examples, training component 410 selects an attribute-specific caption as a positive training sample. For example, a specific attribute can be a particular color or background, and an attribute-specific caption can include words relating to the particular color or background. In some examples, training component 410 generates a negative training sample by removing words related to a specific attribute from the attribute-specific caption. In some examples, training component 410 trains multi-modal encoder 430 based on the negative training sample, where the training encourages the multi-modal encoder 430 to include the words related to the specific attribute. In some aspects, the parameters of image captioning network 425 are updated to encourage the caption to include a large amount of distinctive information about the image. According to some aspects, training component 410 is configured to generate sample pairs for a specific attribute, where multi-modal encoder 430 is fine-tuned based on the sample pairs.

According to some aspects, search component 415 is configured to receive a search query comprising the image and to retrieve images from a database based on the caption and the search query. According to some aspects, search component 415 receives a search query including the image. In some examples, search component 415 retrieves image search results from a database based on the caption and the search query. In some examples, search component 415 receives a search query describing an attribute to be searched. In some examples, search component 415 determines that the caption includes the attribute to be searched. In some examples, search component 415 retrieves the image in response to the search query based on the determination. In some examples, search component 415 presents the image and caption for display together to a user.

In one aspect, machine learning model 420 includes image captioning network 425, multi-modal encoder 430, and grammar network 435. In some examples, each of image captioning network 425, multi-modal encoder 430, and grammar network 435 includes one or more artificial neural networks as described with reference to FIG. 1.

In some examples, image captioning network 425 includes one or more convolutional neural networks (CNNs). A CNN is a class of ANN that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In some examples, image captioning network 425 includes one or more recurrent neural networks (RNNs). A recurrent neural network (RNN) is a class of ANN in which connections between nodes form a directed graph along an ordered (i.e., a temporal) sequence. This enables an RNN to model temporally dynamic behavior such as predicting what element should come next in a sequence. Thus, an RNN is suitable for tasks that involve ordered sequences such as text recognition (where words are ordered in a sentence). The term RNN may include finite impulse recurrent networks (characterized by nodes forming a directed acyclic graph), and infinite impulse recurrent networks (characterized by nodes forming a directed cyclic graph).

According to some aspects, image captioning network 425 receives an image. For example, image captioning network 425 can receive an image from a database as described with reference to FIGS. 1-2. In some examples, image captioning network 425 encodes the image to obtain a hidden image representation. For example, in some embodiments, image captioning network 425 can obtain the hidden image representation by encoding the image via a CNN. In some examples, image captioning network 425 decodes the hidden image representation to obtain a caption describing the image. For example, in some embodiments, image captioning network 425 can obtain the caption by decoding the hidden representation via an RNN. Similarly, according to some aspects, image captioning network 425 generates a training caption for a training image. For example, in some embodiments, image captioning network 425 can generate the training caption by encoding the training image to obtain a hidden training representation and decoding the hidden training representation.

In some examples, image captioning network 425 is trained by encoding training images and training captions from image captioning network 425 in a same embedding space using multi-modal encoder 430, and by comparing the encoded training images and the encoded training captions. The term "embedding space" in a machine learning context refers to a vector space that is used in a word embedding. A word embedding is a learned representation for text where words that have the same meaning have a similar representation. GloVe and Word2vec are examples of systems for obtaining a vector representation of words. GloVe is an unsupervised algorithm for training a network using on aggregated global word-word co-occurrence statistics from a corpus. Similarly, a Word2vec model may include a shallow neural network trained to reconstruct the linguistic context of words. GloVe and Word2vec models may take a large corpus of text and produces a vector space as output. In some cases, the vector space may have a large number of dimensions. Each word in the corpus is assigned a vector in the space. Word vectors are positioned in the vector space in a manner such that similar words are located nearby in the vector space. In some cases, an embedding space may include syntactic or context information in additional to semantic information for individual words.

According to some aspects, image captioning network 425 is configured to encode an image to obtain a hidden image representation and to decode the hidden image representation to obtain a caption describing the image, where image captioning network 425 is trained via training component 410 by comparing the encoded training caption and the encoded training image. In some aspects, image captioning network 425 is trained by training component 410 based on an output of grammar network 435.

In some aspects, image captioning network 425 includes a transformer model. A transformer model is a deep learning model that is useful in natural language processing applications and that operates according to an attention mechanism. An attention mechanism is a method of placing differing levels of importance on different elements of an input. Calculating attention can be a three-step process of computing the similarity between a query and key vectors obtained from an input to generate attention weights, using a softmax function to normalize the attention weights, and weighing the attention weights in together with the corresponding values. A softmax function is used as the activation function of a neural network to normalize the output of the network to a probability distribution over predicted output classes.

After applying the softmax function, each component of the feature map is in the interval (0, 1) and the components add up to one. These values are interpreted as probabilities. Accordingly, in some examples, a transformer model of image captioning network 425 can receive an image as input, split the image into a grid of patches, encode the patches to obtain a weighted hidden representation, and decode the hidden representation to obtain a caption. Image captioning network 425 is an example of, or includes aspects of, the corresponding element described with reference to FIG. 7.

According to some aspects, multi-modal encoder 430 encodes the training caption to obtain an encoded training caption. In some examples, multi-modal encoder 430 encodes the training image to obtain an encoded training image. In some examples, multi-modal encoder 430 is an image-text discriminative model that is pre-trained on large image-text pairs taken from the internet.

In some aspects, multi-modal encoder 430 includes a contrastive language-image pre-training (CLIP) model. Contrastive Language-Image Pre-Training (CLIP) is a neural network that is trained to efficiently learn visual concepts from natural language supervision. CLIP can be instructed in natural language to perform a variety of classification benchmarks without directly optimizing for the benchmarks' performance, in a manner building on "zero-shot" or zero-data learning. CLIP can learn from unfiltered, highly varied, and highly noisy data, such as text paired with images found across the Internet, in a similar but more efficient manner to zero-shot learning, thus reducing the need for expensive and large labeled datasets.

A multi-modal encoder model can be applied to nearly arbitrary visual classification tasks so that the model may predict the likelihood of a text description being paired with a particular image, removing the need for users to design their own classifiers and the need for task-specific training data. For example, a multi-modal encoder model can be applied to a new task by inputting names of the task's visual concepts to the model's text encoder. The model can then output a linear classifier of the multi-modal encoder's visual representations. Multi-modal encoder 430 is an example of, or includes aspects of, the corresponding element described with reference to FIGS. 7-8.

In some examples, grammar network 430 is a multi-layer perceptron. The term "perceptron" refers to a layer of neural network. According to some aspects, grammar network 435 computes a grammar score for an output of the multi-modal encoder 430. For example, grammar network 435 calculates grammar score g(c) according to a sigmoid activation function that takes an output of multi-modal encoder 430 as input. In some examples, grammar network 435 selects a grammatically correct caption as a positive training sample. For example, grammar network 435 can identify and select a caption as grammatically correct caption based on the grammar score g(c) meeting or exceeding a threshold value. In some examples, training component 410 generates a negative training sample corresponding to a positive training sample by modifying a grammatically correct caption to form a grammatically incorrect caption, where the multi-modal encoder 430 is trained using a contrastive learning loss contrastive learning loss or a classification loss based on the positive training sample and the negative training sample.

In some aspects, multi-modal encoder 430 is fine-tuned based on an output of grammar network 435, and in some examples, training component 410 trains multi-modal encoder 430 based on a grammar score. For example, training component 410 can compute an augmented reward function as the sum of the reward function R (I, c) and the grammar score g(c) and further train multi-modal encoder 430 based on the augmented reward function.

Grammar network 435 is configured to generate a grammar score that can be used to generate more grammatical captions. Grammar network 435 is an example of, or includes aspects of, the corresponding element described with reference to FIG. 8.

Image Captioning

Methods for image captioning are described with reference to FIGS. 5 and 6. One or more aspects of a method, apparatus, and non-transitory computer-readable medium include receiving an image; encoding the image using an image captioning network to obtain a hidden image representation; and decoding the hidden image representation using the image captioning network to obtain a caption describing the image, wherein the image captioning network is trained by encoding training images and training captions from image captioning network in a same embedding space using a multi-modal encoder, and by comparing the encoded training images and the encoded training captions.

Some examples of the method, apparatus, non-transitory computer readable medium, and system further include receiving a search query comprising the image. Some examples further include retrieving image search results from a database based on the caption and the search query.

Some examples of the method, apparatus, non-transitory computer readable medium, and system further include receiving a search query describing an attribute to be searched. Some examples further include determining that the caption includes the attribute to be searched. Some examples further include retrieving the image in response to the search query based on the determination. Some examples of the method, apparatus, non-transitory computer readable medium, and system further include presenting the image and caption for display together to a user.

Figure 5:
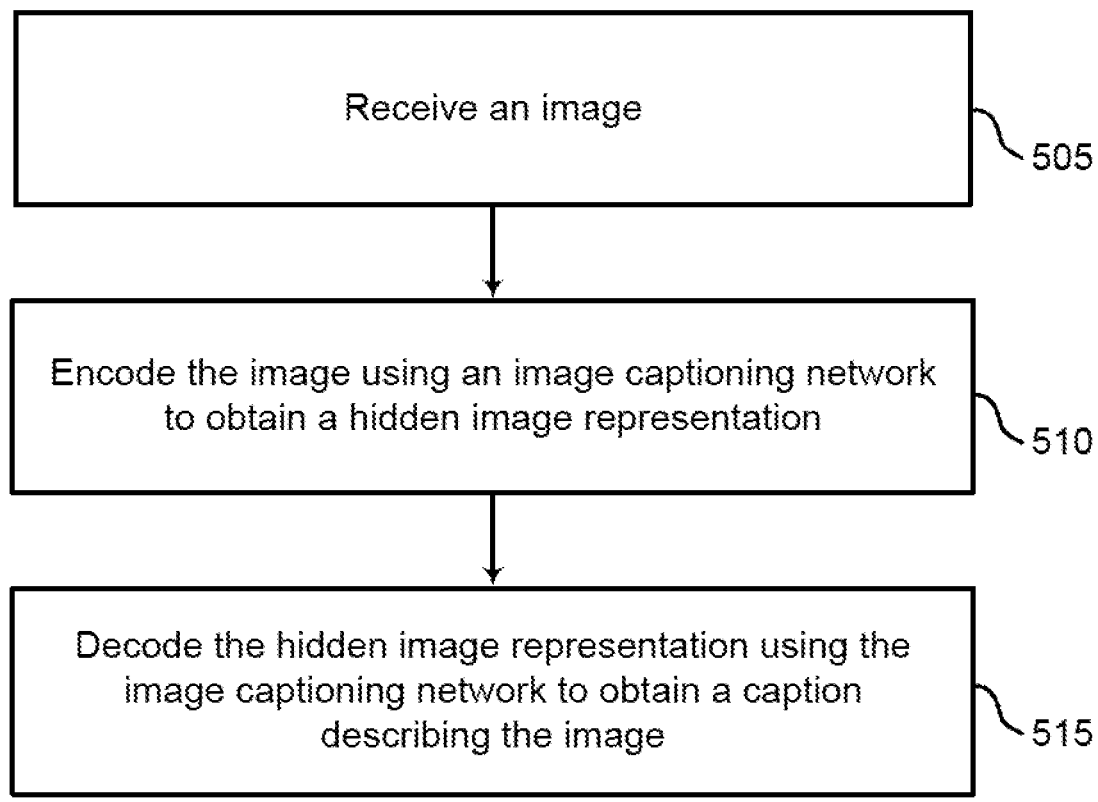
FIG. 5 shows an example of a method for caption generation according to aspects of the present disclosure.

FIG. 5 shows an example of a method for caption generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system receives an image. In some cases, the operations of this step refer to, or may be performed by, an image captioning network as described with reference to FIG. 4. In some embodiments, receiving an image may be performed as described with reference to FIG. 7.

At operation 510, the system encodes the image using an image captioning network to obtain a hidden image representation. In some cases, the operations of this step refer to, or may be performed by, an image captioning network as described with reference to FIGS. 4 and 7. In some embodiments, encoding an image may be performed as described with reference to FIG. 6.

At operation 515, the system decodes the hidden image representation using the image captioning network to obtain a caption describing the image, where the image captioning network is trained by encoding training images and training captions from image captioning network in a same embedding space using a multi-modal encoder, and by comparing the encoded training images and the encoded training captions. In some cases, the operations of this step refer to, or may be performed by, an image captioning network as described with reference to FIGS. 4 and 7. In some embodiments, decoding the hidden representation may performed as described with reference to FIG. 6. In some cases, training the image captioning network may be performed by a training component as described with reference to FIG. 4. In some embodiments, training the image captioning network may be performed as described with reference to FIGS. 9-12.

Figure 6:
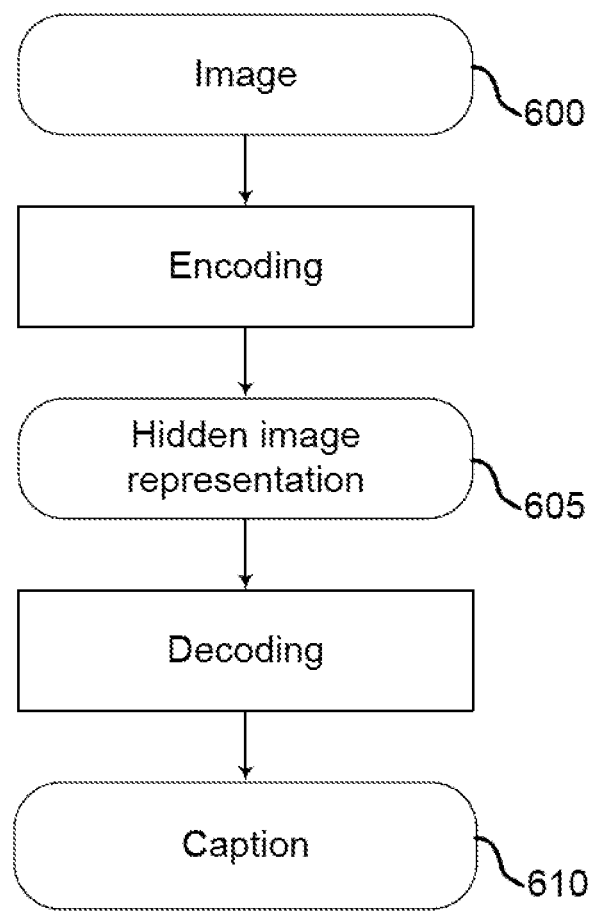
FIG. 6 shows an example of an image captioning method according to aspects of the present disclosure.

FIG. 6 shows an example of an image captioning process according to aspects of the present disclosure. The example shown includes image 600, hidden image representation 605, and caption 610. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

The system receives an image 600 as input and encodes image 600 to obtain hidden image representation 605. In some cases, the operations of this step refer to, or may be performed by, an image captioning network as described with reference to FIGS. 4 and 7. For example, in some embodiments, the image captioning network can obtain the hidden image representation by encoding the image via a CNN. In some embodiments, the image captioning network can encode the image via a transformer model.

The system decodes the hidden representation 605 and outputs a caption 610. In some cases, the operation of this step refer to, or may be performed by, an image captioning network as described with reference to FIGS. 4 and 7. For example, in some embodiments, the image captioning network can obtain the caption by decoding the hidden image representation via an RNN. In some embodiments, the image captioning network can decode the image via a transformer model.

Training

FIGS. 7-12 describe systems and methods for training a machine learning model. One or more aspects of the method include receiving an image; encoding the image using an image captioning network to obtain a hidden image representation; and decoding the hidden image representation using the image captioning network to obtain a caption describing the image, wherein the image captioning network is trained by encoding training images and training captions from image captioning network in a same embedding space using a multi-modal encoder, and by comparing the encoded training images and the encoded training captions.

Some examples of the method further include receiving a search query comprising the image. Some examples further include retrieving image search results from a database based on the caption and the search query. Some examples of the method further include receiving a search query describing an attribute to be searched. Some examples further include determining that the caption includes the attribute to be searched. Some examples further include retrieving the image in response to the search query based on the determination. Some examples of the method further include presenting the image and caption for display together to a user.

Figure 7:
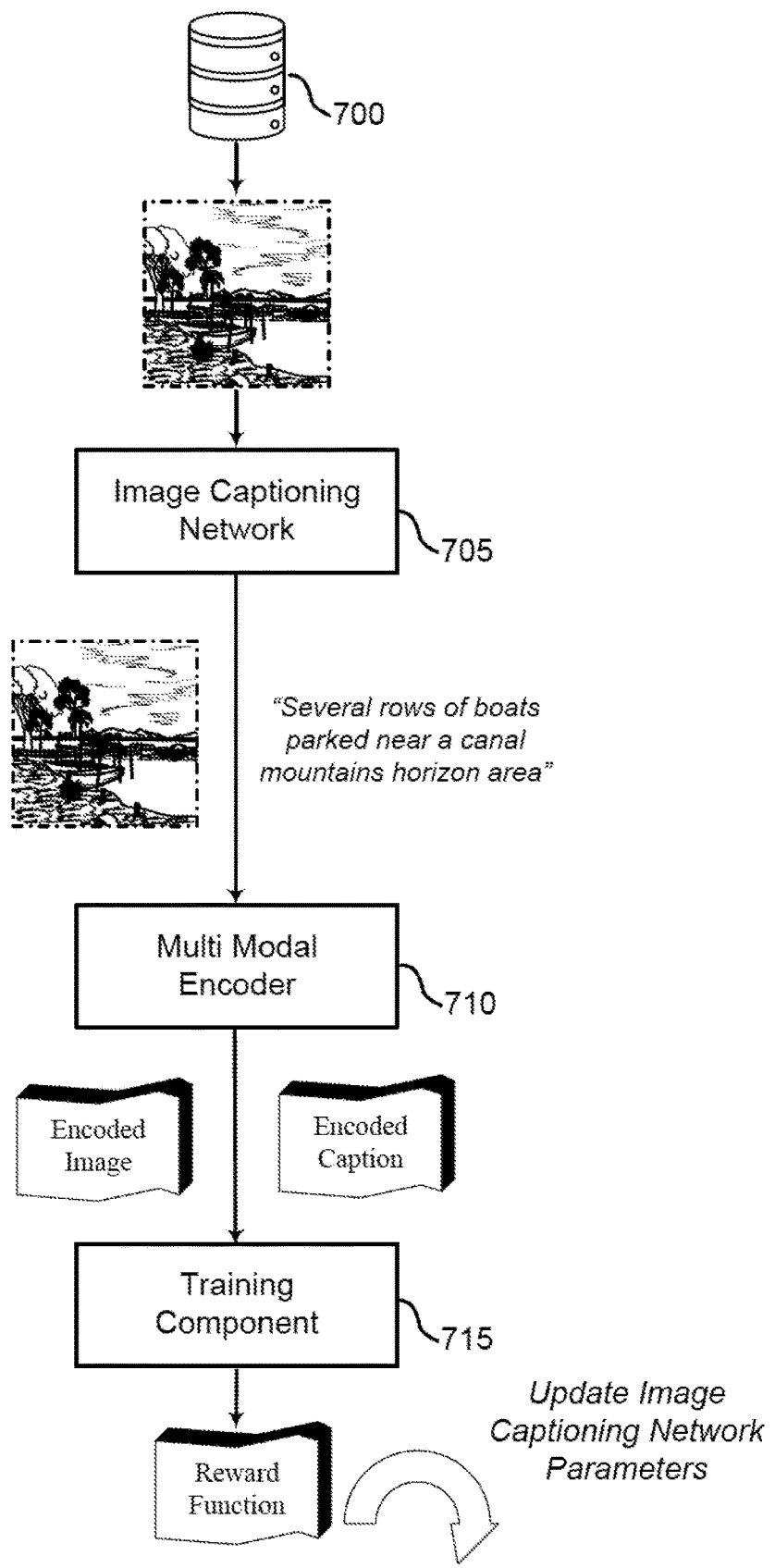
FIG. 7 shows an example of updating parameters of an image captioning network based on a reward function according to aspects of the present disclosure.

FIG. 7 shows an example of an example of updating parameters of an image captioning network based on a reward function according to aspects of the present disclosure. The example shown includes database 700, image captioning network 705, multi-modal encoder 710, and training component 715. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Image captioning network 705 receives a training image from database 700. In some embodiments, receiving the training image may be performed as described with reference to FIG. 4. Image captioning network 705 generates a training caption for the training image and provides the training caption and the training image to multi-modal encoder 710. In some embodiments, generating the training caption may be performed as described with reference to FIG. 4. Multi-modal encoder 710 encodes the training caption to obtain an encoded training caption, and encodes the training image to obtain an encoded training image. In some embodiments, encoding the training caption and the training image may be performed as described with reference to FIG. 4. Multi-modal encoder 710 provides the encoded training image and the encoded training caption to training component 715. Training component 715 computes a reward function based on the encoded training caption and the encoded training image. In some embodiments, computing the reward function may be performed as described with reference to FIG. 4. Training component 715 updates the parameters of image captioning network 705 based on the reward function. In some embodiments, updating the parameters of image captioning network 705 may be performed as described with reference to FIG. 4.

Figure 8:
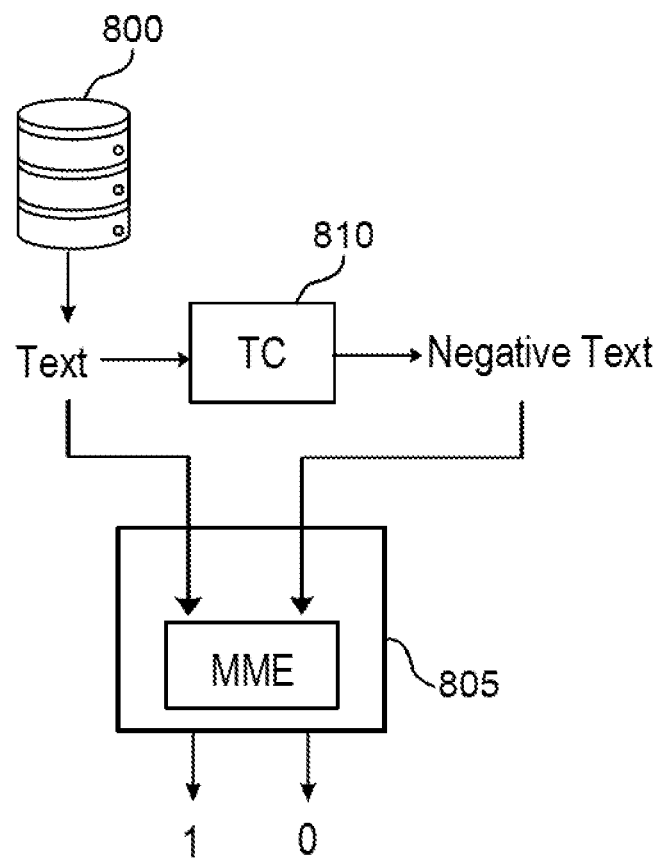
FIG. 8 shows an example of fine-tuning a multi-modal encoder according to aspects of the present disclosure.

FIG. 8 shows an example of an example of fine-tuning a multi-modal encoder 805 according to aspects of the present disclosure. The example shown includes database 800, multi-modal encoder 805, and training component 810.

Database 800 is an example of, or includes aspects of, the corresponding element described with reference to FIGS. 1-2 and 7. Multi-modal encoder 805 is an example of, or includes aspects of, the corresponding element described with reference to FIGS. 4 and 7. Training component 810 is an example of, or includes aspects of, the corresponding element described with reference to FIGS. 4 and 7.

Referring to FIG. 8, training component 810 can select text that as a positive training sample. In some cases, the text can be stored in database 800. In some cases, the text is a grammatically correct caption. Training component 810 generates a negative training sample from the text by modifying the text to form negative text. In some cases, the negative text is a grammatically incorrect caption. Training component 810 trains multi-modal encoder 805 using a contrastive learning loss based on the positive training sample and the negative training sample. For example, in some cases, multi-modal encoder 805 computes a probability between 1 and 0 that the positive training sample and the negative training sample are similar.

Figure 9:
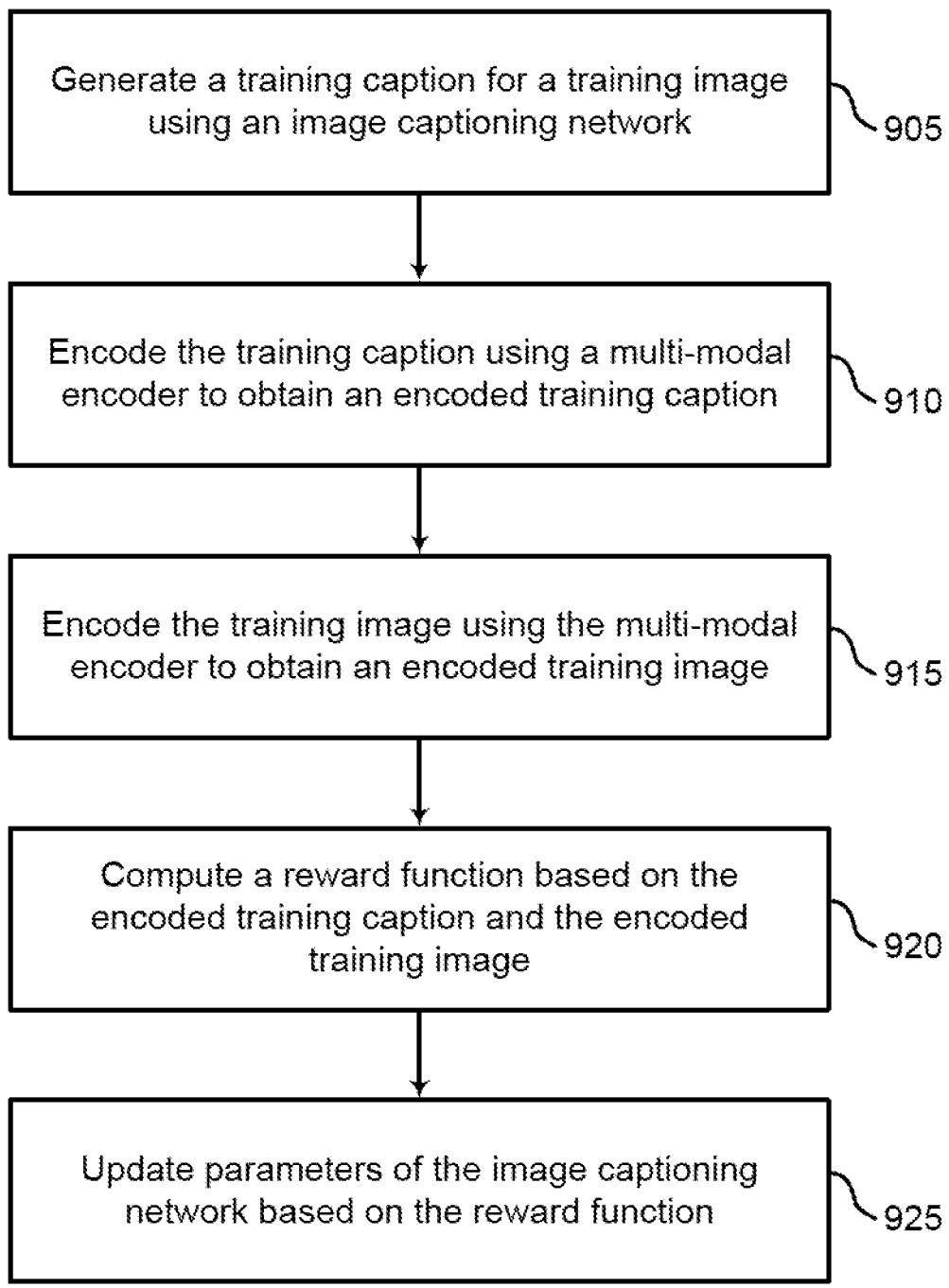
FIG. 9 shows an example of a method for training a neural network according to aspects of the present disclosure.

FIG. 9 shows an example of a method 900 for training a neural network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system generates a training caption for a training image using an image captioning network. The term "training caption" refers to a collection of words generated by a neural network that describes an input image. A training caption is primarily used as an input for a neural network so that the neural network learns to produce more optimized image captions. Image captions are useful in an image search context so that associated images can be searched for using a natural language query. Neural network-generated image captions are also useful as they avoid the time and labor that would be required for a human to look at an image and describe it. The term "training image" refers to an image that is input into a neural network to produce the training caption. In some cases, the operations of this step refer to, or may be performed by, an image captioning network as described with reference to FIGS. 4 and 7. As described with reference to FIG. 4, an image captioning network can be one or more neural networks. In some cases, image captioning network includes one or more CNNs. In some cases, image captioning network includes one or more RNNs. In some cases, image captioning network includes a transformer model. In some cases, the training image is stored in a database and the image captioning network retrieves the training image from the database. In some cases, the image captioning network stores the training caption in the database. In some embodiments, generating the training caption may be performed as described with reference to FIG. 4.

At operation 910, the system encodes the training caption using a multi-modal encoder to obtain an encoded training caption. The term "encodes" in this context refers to outputting a machine-readable version of the training caption. In some cases, multi-modal encoder includes one or more neural networks. The term "multi-modal" in this context means that the multi-modal encoder accepts both images and text as inputs. In some cases, the operations of this step refer to, or may be performed by, a multi-modal encoder as described with reference to FIGS. 4, 7, and 8. In some cases, the multi-modal encoder stores the encoded training caption in a database. In some embodiments, encoding the training caption may be performed as described with reference to FIG. 4.

At operation 915, the system encodes the training image using the multi-modal encoder to obtain an encoded training image. The term encodes can be applied to either text or images, and in some examples, a same machine learning model is capable of handling both kinds of input. In some cases, the operations of this step refer to, or may be performed by, a multi-modal encoder as described with reference to FIGS. 4, 7, and 8. In some cases, the multi-modal encoder stores the encoded training image in a database. In some embodiments, encoding the training image may be performed as described with reference to FIG. 4.

At operation 920, the system computes a reward function based on the encoded training caption and the encoded training image. The term "reward function" in this context refers to a function that is used in a reinforcement learning context to train a neural network, as described with reference to FIG. 4. In some cases, the operations of this step refer to, or may be performed by, a training component as described with reference to FIGS. 4, 7, and 8. In some embodiments, computing a reward function may be performed as described with reference to FIG. 4.

According to some aspects, a training component computes a reward function based on the encoded training caption and the encoded training image. In some embodiments, reward function R(I, c) can be computed according to the equation:

$$R(I, c) = w * \max\left(\frac{f^I(I)^T f^T(c)}{|f^I(I)| \cdot |f^T(c)|}, 0\right) \quad (1)$$

where I is the encoded training image, c is the encoded training caption, $f^I$, $f^T$ are image and text encoding functions, respectively, of the multi-modal encoder, and w is a rescaling operator. In some examples, w can be set to 2.5. By maximizing the reward function, the image captioning network is encouraged to generate captions that contain distinctive information about an input image.

At operation 925, the system updates parameters of the image captioning network based on the reward function. For example, in a reinforcement learning context, the image captioning network can be trained to output training captions and training images that ultimately result in a maximized value for the reward function, such that the system produces increasingly detailed and information-rich image captions for images. In some cases, the operations of this step refer to, or may be performed by, a training component as described with reference to FIGS. 4, 7, and 8. In some embodiments, updating parameters of the image captioning network can be performed as described with reference to FIG. 4.

For example, a training component can adjust input and output parameters of the image captioning network so that the multi-modal encoder produces encoded training captions and encoded training images where the value of $f^I$ and $f^T$ are maximized. In some aspects, the parameters of the image captioning network are updated based on a reinforcement learning model with a self-critical baseline. In some examples, the training component computes a gradient of an expected value of the reward function, where parameters of the image captioning network are updated based on the gradient. For example, the gradient of the expected value of the reward function can be approximated for a generated caption c, where rewards are normalized with a baseline reward b from captions generated with greedy decoding $c_{greedy}$:

$$\nabla_\theta \mathop{\mathbb{E}}_{\hat{c} \sim P_\theta(c|I)} [R(I, \hat{c})] \approx (R(I, \hat{c}) - b)\nabla_\theta \log P_\theta(\hat{c}|I) \quad (2)$$

where $b = R(I, c_{greedy})$.

Figure 10:
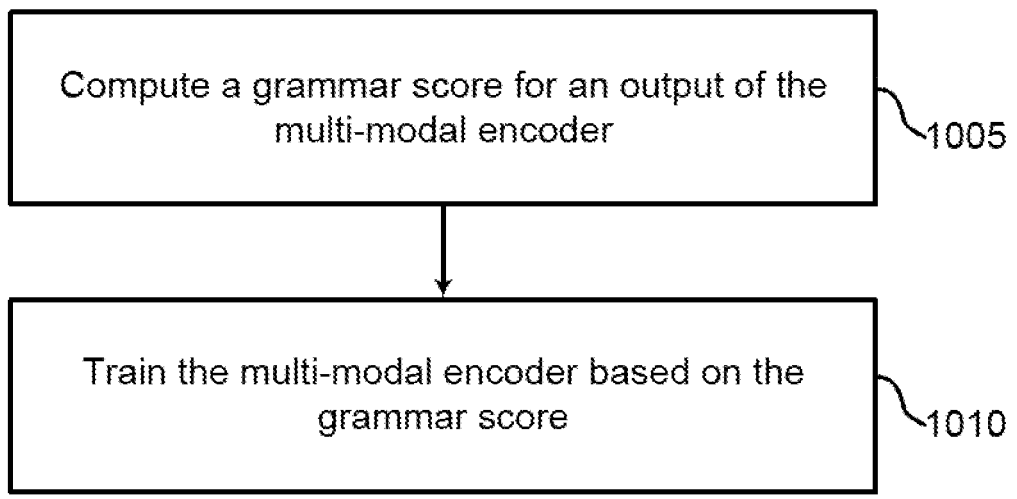
FIG. 10 shows an example of a method for fine-tuning a neural network based on a grammar score according to aspects of the present disclosure.

FIG. 10 shows an example of a method 1000 for fine-tuning a neural network based on a grammar score according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system computes a grammar score for an output of the multi-modal encoder. In some cases, the operations of this step refer to, or may be performed by, a grammar network as described with reference to FIG. 4. In some embodiments, computing a grammar score may be performed as described with reference to FIG. 4.

At operation 1010, the system trains the multi-modal encoder based on the grammar score. In some cases, the operations of this step refer to, or may be performed by, a training component as described with reference to FIGS. 4, 7, and 8. In some embodiments, training the multi-modal encoder based on the grammar score may be performed as described with reference to FIG. 4.

Figure 11:
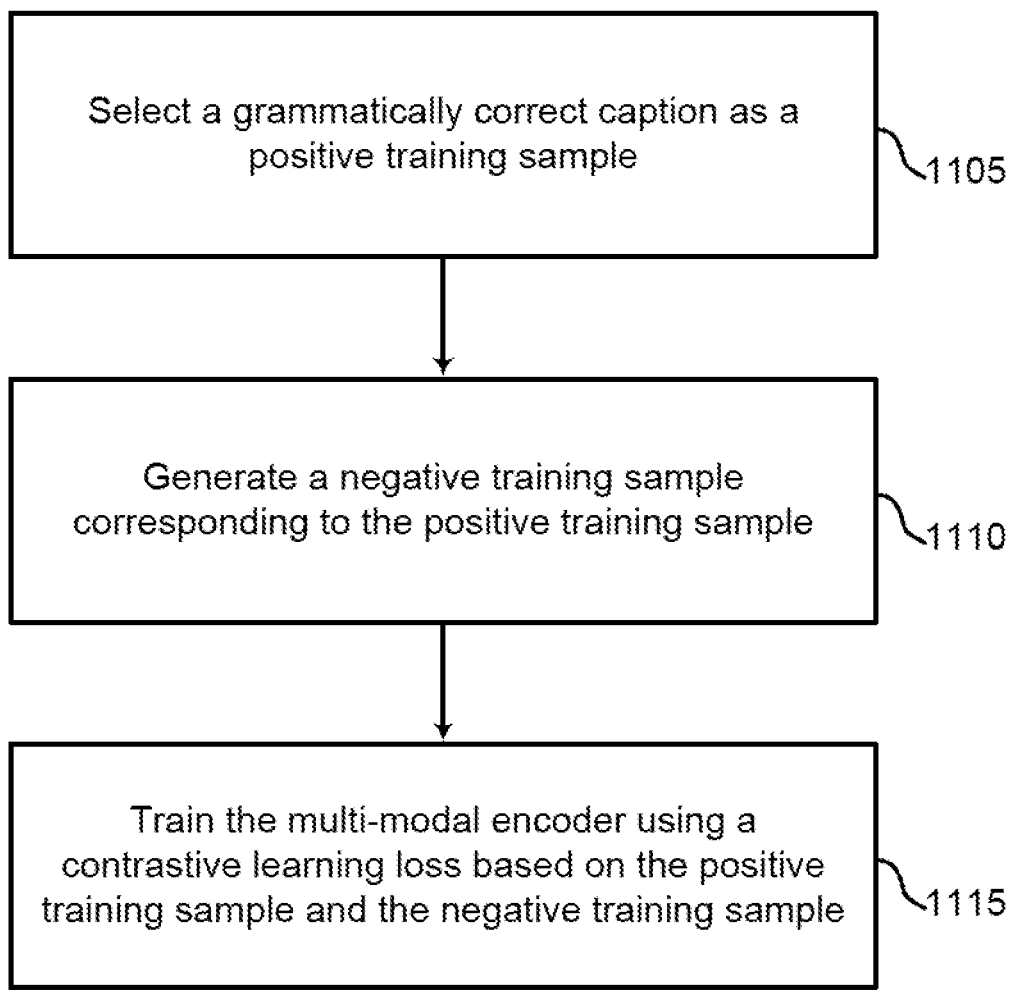
FIG. 11 shows an example of a method for fine-tuning a neural network based on a negative training sample according to aspects of the present disclosure.

FIG. 11 shows an example of a method 1100 for fine-tuning a neural network based on a negative training sample according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system selects a grammatically correct caption as a positive training sample. In some cases, the operations of this step refer to, or may be performed by, a grammar network as described with reference to FIG. 4. In some embodiments, selecting a grammatically correct caption may be performed as described with reference to FIGS. 4 and 7.

At operation 1110, the system generates a negative training sample corresponding to the positive training sample. In some cases, the operations of this step refer to, or may be performed by, a training component as described with reference to FIGS. 4, 7, and 8. In some embodiments, generating a negative training sample may be performed as described with reference to FIGS. 4 and 7.

At operation 1115, the system trains the multi-modal encoder using a contrastive learning loss based on the positive training sample and the negative training sample. In some embodiments, training the multi-modal encoder using a contrastive learning loss may be performed as described with reference to FIGS. 4 and 7.

Figure 12:
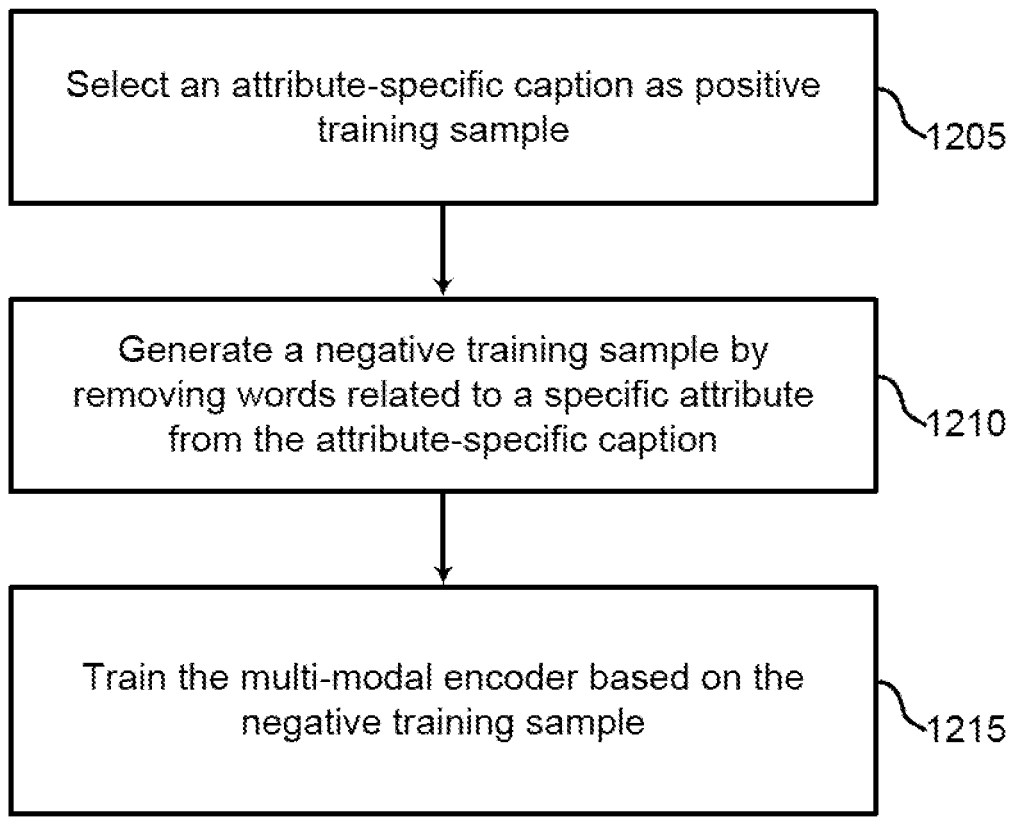
FIG. 12 shows an example of a method for fine-tuning a neural network based on a specific attribute according to aspects of the present disclosure.

FIG. 12 shows an example of a method 1200 for fine-tuning a neural network based on a specific attribute according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system selects an attribute-specific caption as positive training sample. In some cases, the operations of this step refer to, or may be performed by, a training component as described with reference to FIGS. 4, 7, and 8. In some embodiments, selecting an attribute-specific caption may be performed as described with reference to FIG. 4.

At operation 1210, the system generates a negative training sample by removing words related to a specific attribute from the attribute-specific caption. In some cases, the operations of this step refer to, or may be performed by, a training component as described with reference to FIGS. 4, 7, and 8. In some embodiments, generating a negative training sample may be performed as described with reference to FIG. 4.

At operation 1215, the system trains the multi-modal encoder based on the negative training sample. In some cases, the operations of this step refer to, or may be performed by, a training component as described with reference to FIGS. 4, 7, and 8. In some embodiments, training the multi-modal encoder based on the negative training sample may be performed as described with reference to FIG. 4.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method, comprising:
    generating a training caption for a training image using an image captioning network;
    encoding the training caption using a multi-modal encoder to obtain an encoded training caption;
    encoding the training image using the multi-modal encoder to obtain an encoded training image;
    computing a reward function based on the encoded training caption and the encoded training image; and
    updating parameters of the image captioning network based on the reward function and a grammar score corresponding to a grammatical correctness of the training caption.

2. The method of claim 1, further comprising:
    computing a gradient of an expected value of the reward function, wherein the parameters of the image captioning network are updated based on the gradient.

3. The method of claim 1, further comprising:
    computing the grammar score for an output of the multi-modal encoder; and
    training the multi-modal encoder based on the grammar score.

4. The method of claim 1, further comprising:
    selecting a grammatically correct caption as a positive training sample; and
    generating a negative training sample corresponding to the positive training sample by modifying the grammatically correct caption to form a grammatically incorrect caption, wherein the multi-modal encoder is trained using a contrastive learning loss or a classification loss based on the positive training sample and the negative training sample.

5. The method of claim 1, further comprising:
    computing the grammar score for the training caption, wherein the parameters of the image captioning network are updated based on the grammar score.

6. The method of claim 1, further comprising:
    selecting an attribute-specific caption as positive training sample;
    generating a negative training sample by removing words related to a specific attribute from the attribute-specific caption; and training the multi-modal encoder based on the negative training sample, wherein the training encourages the multi-modal encoder to include the words related to the specific attribute.

7. The method of claim 1, wherein:
the parameters of the image captioning network are updated based on a reinforcement learning model with a self-critical baseline.

8. The method of claim 1, wherein:
the parameters of the image captioning network are updated to encourage the caption to include a large amount of distinctive information about the image.

9. A method, comprising:
receiving an image;
encoding the image using an image captioning network to obtain a hidden image representation; and
decoding the hidden image representation using the image captioning network to obtain a caption describing the image, wherein the image captioning network is trained by encoding a training image and a training caption from the image captioning network in a same embedding space using a multi-modal encoder to obtain an encoded training image and an encoded training caption, respectively, computing a reward function based on the encoded training caption and the encoded training image, and updating parameters of the image captioning network based on the reward function and a grammar score corresponding to a grammatical correctness of the training caption.

10. The method of claim 9, further comprising:
receiving a search query comprising the image; and
retrieving image search results from a database based on the caption and the search query.

11. The method of claim 9, further comprising:
receiving a search query describing an attribute to be searched;
determining that the caption includes the attribute to be searched; and
retrieving the image in response to the search query based on the determination.

12. The method of claim 9, further comprising:
presenting the image and caption for display together to a user.

13. An apparatus, comprising:
a multi-modal encoder configured to encode a training caption to obtain an encoded training caption, and to encode a training image to obtain an encoded training image; and
an image captioning network configured to encode an image to obtain a hidden image representation and to decode the hidden image representation to obtain a caption describing the image, wherein the image captioning network is trained based on a grammar score corresponding to a grammatical correctness of the training caption and by comparing the encoded training caption and the encoded training image.

14. The apparatus of claim 13, further comprising:
a grammar network configured to compute the grammar score based on the training caption.

15. The apparatus of claim 14, wherein:
the multi-modal encoder is fine-tuned based on an output of the grammar network.

16. The apparatus of claim 14, wherein:
the image captioning network is trained based on an output of the grammar network.

17. The apparatus of claim 13, further comprising:
a training component configured to generate sample pairs for a specific attribute, wherein the multi-modal encoder is fine-tuned based on the sample pairs.

18. The apparatus of claim 13, wherein:
the multi-modal encoder comprises a contrastive language-image pre-training (CLIP) model.

19. The apparatus of claim 13, wherein:
the image captioning network comprises a transformer model.

20. The apparatus of claim 13, further comprising:
a search component configured to receive a search query comprising the image and to retrieve images from a database based on the caption and the search query.

* * * * *